United States Patent [19]

Fuchiwaki et al.

[11] Patent Number: 5,268,731
[45] Date of Patent: Dec. 7, 1993

[54] WHEEL ALIGNMENT MEASURING APPARATUS

[75] Inventors: Motoaki Fuchiwaki; Toshiyuki Kaya, both of Hiroshima, Japan

[73] Assignee: Chuo Electronic Measurement Co., Ltd., Hiroshima, Japan

[21] Appl. No.: 924,776

[22] Filed: Aug. 4, 1992

[51] Int. Cl.⁵ .................. G01C 3/08; G01B 11/26; G01B 5/24
[52] U.S. Cl. .................. 356/5; 33/203.12; 33/203.15; 33/203.18; 33/288; 33/DIG. 21; 356/152
[58] Field of Search .................. 356/5, 141, 152; 33/288, 203.12, 203.15, 203.18, DIG. 21

[56] References Cited

U.S. PATENT DOCUMENTS

| | | | |
|---|---|---|---|
| 4,863,266 | 9/1989 | Masuko et al. | 33/288 |
| 4,899,218 | 2/1990 | Waldecker et al. | 358/107 |
| 5,111,585 | 5/1992 | Kawashima et al. | 33/203.12 |

*Primary Examiner*—Stephen C. Buczinski
*Attorney, Agent, or Firm*—Jordan and Hamburg

[57] ABSTRACT

The present invention relates to a wheel alignment measuring apparatus which measures the toe-in length or angle and camber angle of each tire (17) of a car.

The wheel alignment measuring apparatus can be used to measure the distances to various points on the surface of the tire (17) by means of the light of a predetermined wavelength emitted from the light-emitting means (4) and to determine the toe-in angle or length and camber angle of the tire (17) based on the measured distances. In other words, such measurement can be done without any contact with the tire (17) under inspection, thus it is possible to prevent any trouble which would occur when such measurement is done in contact with the tire, such as error caused by the oscillation or the like of the tire (17).

Also, with the wheel alignment measuring apparatus according to the present invention, it is possible to effectively correct any error of measurement caused by any irregularities on the tire (17), thereby attaining a higher accuracy of measurement since the calculating means (6) incorporated appropriately calculates the distances to various points on the tire surface from the data obtained based on the time taken for the light emitted toward various points on the entire circumference of each tire (17) at many short time intervals to return, as reflected, to the light-emitting means (photo-detecting means).

3 Claims, 7 Drawing Sheets

WHEEL ALIGNMENT MEASURING APPARATUS

FIELD OF THE INVENTION

The present invention relates to a wheel alignment measuring apparatus intended for use to measure the toe-in length or angle and camber angle of each tire fixed on a wheel.

BACKGROUND OF THE INVENTION

The tires supporting a car body are installed at a predetermined angle, that is, at a predetermined camber angle and toe-in angle, to the right and left ends of an axle by means of their associated wheels. These angles are required to be within respective predetermined ranges. The camber angle is necessary to prevent the tire from being disengaged from the wheel installed on the axis when the weight of the car body is applied. With the camber angle, the tires are positioned on the ground surface to be inclined divergently from the ground surface, namely, their tops are projected slightly outward from the bottoms in contact with the ground surface. The toe-in angle is required for securing the linear running of the car and is such that the distance between the front portions of the right and left tires is smaller than that between the rear portions. In other words, when viewed from above, the right and left tires are converged frontally of the car. The camber and toe-in angles are very important factors in safe driving of the car. Thus, it is legally required that these angles should be accurately measured and readjusted after the tires are installed or during car inspection, etc.

In these circumstances, a variety of apparatuses and methods have been proposed for such a measurement.

For example, an apparatus for measuring the toe-in length or angle and camber angle is known which has a plate or the like to be put in contact with a tire immovably positioned in place to measure the camber and toe-in angles with a measuring means such as manometer or the like.

With such measuring apparatus, however, the relieved markings of a manufacturer's name, standard, etc. provided on the tire surface with which the plate is placed in contact cause an error in the measurement and thus make it impossible to accurately measure the tire angles. Also in this measuring apparatus, since the plate is put in direct contact with the tire, any slight movement of the tire during measurement will possibly cause an error in measurement and the elaborated measuring apparatus to be damaged.

SUMMARY OF THE INVENTION

The present invention has an object to overcome the above-mentioned drawbacks of the conventional techniques by providing a wheel alignment measuring apparatus which can measure the tire toe-in length or angle and camber angle accurately and in which the components will not possibly be damaged during measurement.

The above object can be attained by providing, according to the present invention, a wheel alignment measuring apparatus for measuring the toe-in length or angle and camber angle of each vehicular tire under inspection immovably positioned in place, comprising an X-directional move member which is moved in the direction of the axle coupling the right and left wheels, a Y-directional move member which is moved vertically with respect to the X-directional move member, a rotary disk installed to the end of a rotary shaft pivotably supported on the Y-directional move member so as to face the surface of the tire and which rotates along with the rotary shaft, a positioning means for making the center of rotation of the tire coincide with that of the rotary disk, a light-emitting means provided on the outer surface of the rotary disk opposite to the tire so as to be movable radially of the rotary disk and symmetrical with respect to the center of the rotary disk, the means also being rotatable as the rotary disk rotates and emitting light at many short time intervals, a photo-detecting means for receiving the light reflected from various points on the tire surface, a means for calculating the toe-in length or angle and camber angle of the tire based on the time taken for the light emitted from the light-emitting means to reach the photo-detecting means, and a means displaying the data on the toe-in length or angle and camber angle calculated by the calculating means.

The wheel alignment measuring apparatus according to the present invention can measure the distances to various points on the outer surface of each tire by means of a light of a predetermined wavelength emitted from a light-emitting means, and can determine the toe-in angle or length and camber angle based on the measured distances. Since the apparatus can effect this measurement without any contact with the tire under inspection, no problems arise due to the oscillation or the like of the tire.

Also the apparatus according to the present invention emits light frequently toward various points on the entire circumferential surface of each tire, appropriately calculates, with the calculating means, the toe-in length or angle and camber angle from the data obtained based on the time taken for the light reflected from such points to be received by the photo-detecting means. That is to say, the apparatus can effectively correct any error caused by the irregularities on the tire surface, thereby measuring the toe-in length or angle and camber angle with a high accuracy.

DETAILED DESCRIPTION OF THE PREFERRED EMBODIMENT

Referring now to the drawings, one embodiment of the wheel alignment measuring apparatus according to the present invention will be described below.

Figure 1:
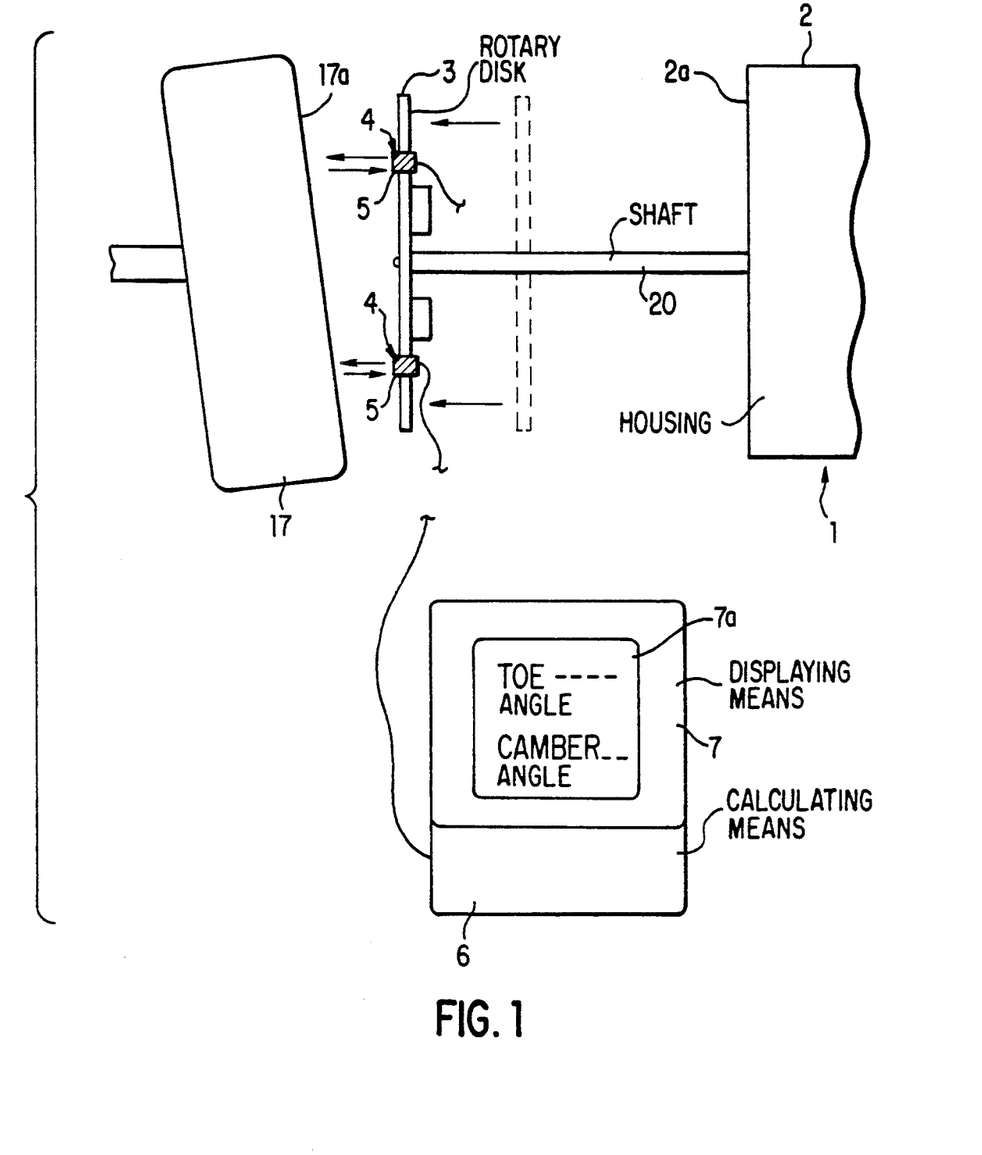
FIG. 1 is a schematic illustration of the wheel alignment measuring apparatus according to the present invention.

FIG. 1 shows the wheel alignment measuring apparatus according to the present invention. One wheel alignment measuring apparatus is used with each tire 17 under inspection and it consists of a main unit 1 in which an X-direction move member and Y-directional moving member are housed, a rotary disk 3 projecting from the lateral side 2a of a housing 2 of the main unit 1, a positioning means 30 (also see FIG. 2), a light-emitting means 4, a photo-detecting means 5, a calculating means 6 and a displaying means 7.

Figure 2:
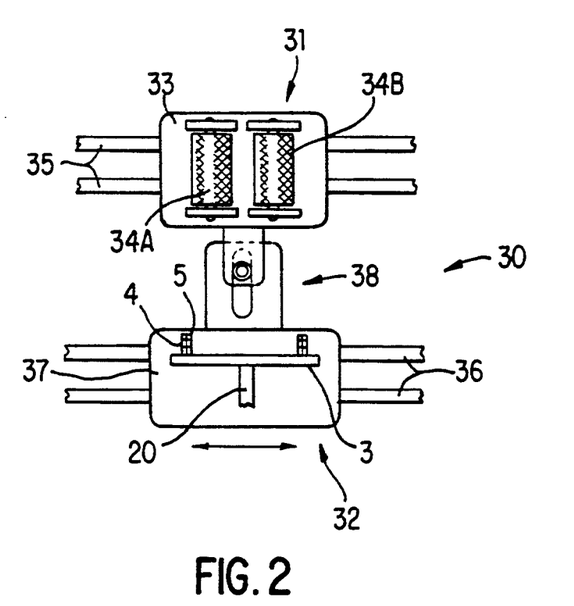
FIG. 2 is a plan view showing the positioning means included in the present invention.
Figure 3:
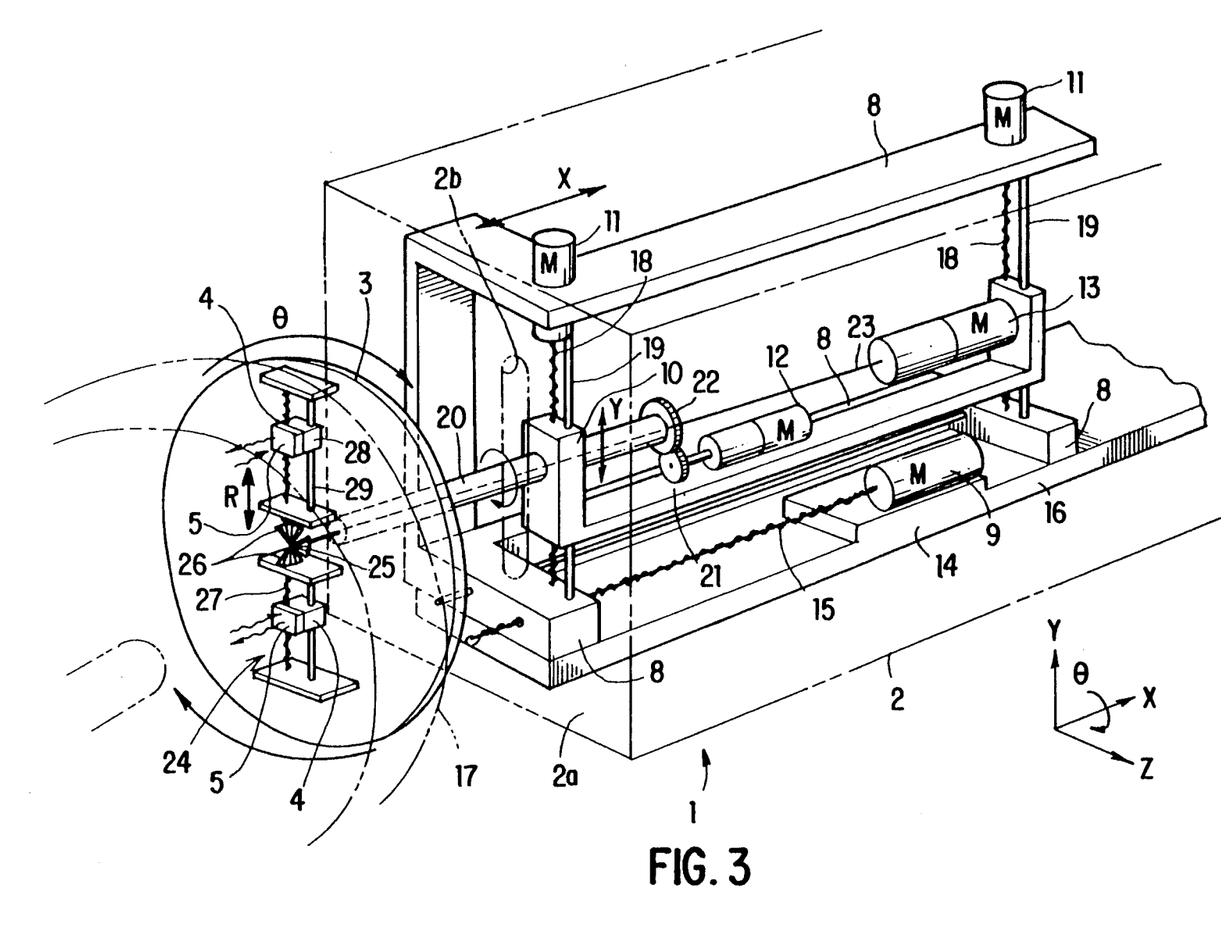
FIG. 3 is a perspective view showing the essential parts of the present invention.

The main unit 1 is accommodated in the box-like housing 2 as shown in FIG. 2, and composed of the X-direction movable member 8, a motor 9 for driving the X-direction movable member 8, the Y-direction movable member 10, a motor 11 for driving the Y-direction movable member 10, a $\theta$-direction movable drive motor 12 which rotates the rotary disk 3, and a R-direction movable drive motor 13 which moves the light-emitting means 4 and photo-detecting means 5 radially of the rotary disk 3. The X-direction movable member 8 has passed therethrough a feed screw 15 driven by the X-direction movable drive motor 9 and also a guide shaft 16. Thus the member 8 is made to slide in the X-direction on a base 14 provided on the bottom of the housing 2 as guided on the guide shaft 16. On the other hand, the Y-direction movable member 10 has passed therethrough a feed screw 18 driven by the Y-direction movable drive motor 11 and also a guide shaft 19. Thus the member 10 is made to slide in the Y-direction, namely in a direction perpendicular to the X-direction movable member 8 as guided on the guide shaft 19, thereby making the center of the rotary disk 3 coincide with that of the tire 17 under inspection according to the diameter of the tire. The $\theta$-direction movable drive motor 12 is fixed on the X-direction movable member 8 to rotate a hollow rotary shaft 20 fixed to the center of the rotary disk 3 by means of gears 21 and 22 in this embodiment, thereby rotating the rotary disk 3 in facing the outer surface of the tire 17 in order to measure the toe-in and camber angles of the tire 17. The rotary shaft 20 is rotatably supported on the Y-direction movable member 10 and has passed therethrough an elongated hole 2b open at the lateral side 2a of housing 2. The R-direction movable drive motor 13 is provided to freely move the light-emitting means 4 and photo-detecting means 5 radially of the rotary disk 3 according to the diameter of the tire 17 under inspection, thereby positioning the light-emitting means 4 and photo-detecting means 5 so as to face the appropriate positions on the outer surface of the tire 17. In this embodiment, a drive shaft 23 is disposed inside the hollow rotary shaft 20. It is rotated to drive an R-directional move mechanism 24 which will be explained below to move the light-emitting means 4 and photo-detecting means 5. The R-direction movable mechanism 24 comprises a bevel gear 26 in mesh with a bevel gear 25 fixed to the end of the drive shaft 23, a feed screw 27 fixed to the bevel gear 26, an R-direction movable member 28 on the feed screw 27 and having the light-emitting means 4 and photo-detecting means 5 mounted together thereon and a guide shaft 29 which guides the R-direction movable member 28 moving thereon.

Figure 4:
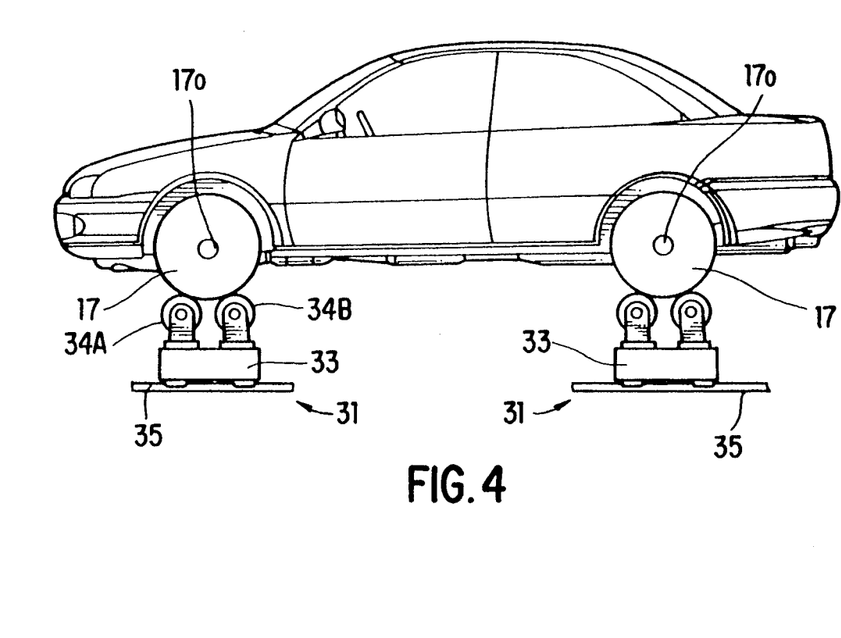
FIG. 4 is a side elevation showing the apparatus when a tire is mounted on the tire support of the positioning means shown in FIG. 1.

There is provided a positioning means 30 for making the rotary shaft 20, being the center of rotation of the rotary disk 3 shown in FIG. 2 coincide with the center of rotation 170 of each tire 17 under inspection shown in FIG. 4. In this embodiment, the positioning means 30 comprises an input button (not shown) used to supply data such as the type of a car having the tires to be measured, the size of the tire, etc., a pair of tire supports 31 movable a predetermined distance in the direction of the wheel space by means of a predetermined driving means (not shown), and a follower 32 which is coupled to the tire supports 31 and moved a same distance in a same direction as the supports 31.

Each of the tire supports 31 comprises a support base 33 slidably provided on guide rails 35 as shown in FIG. 4, and a pair of rollers 34A and 34B provided on the support base 33 for each tire and on which the tire 17 can be freely rotated. Note that each of the tire supports 31 is provided with a fine-adjustment means (not shown) which moves the support base 33 in a direction in which a difference in wheel space from one vehicle to another is absorbed, thus permitting to support each tire correctly for the purpose of measurement.

The follower 32 is slidably provided on the guide rails 36, and has a support base 37 on which the main unit 1 is mounted. The rotary shaft 20 provided in the main unit 1 is so positioned as to always be horizontally aligned with the center of rotation 170 of each tire 17. Moreover, the rotary shaft 20 is vertically moved a predetermined distance by the Y-directional move member 10 appropriately moved vertically with respect to the tire 17 correspondingly to a preset tire size and thus correctly aligned with the center of rotation of the tire 17.

The light-emitting means 4 emits a light of a predetermined wavelength intermittently (at predetermined very short time intervals). In this embodiment, the means 14 uses laser diodes (LD) which can emit laser light of 780 nm in wavelength toward 1,500 points on the entire circumference of the tire 17. A pair of such laser diodes (LD) forming the light-emitting means 4 is provided along with the photo-detecting means 5 point-symmetrically with each other displaced $\pi$ (rad) from each other. One of the laser diodes in pair is used to measure the toe-in length or angle and camber angle. If the toe-in length or angle is not found within a predetermined range of permissible value, both the laser diodes are used simultaneously for quick adjustment while watching the display screen 7a of the displaying means, which will be explained later, for the toe-in length or angle to be within the predetermined range.

The photo-detecting means 5 is provided to receive the light emitted from the light-emitting means 4 and reflected from the tire surface and deliver a predetermined electrical signal to the calculating means 6. The means 5 uses photo-sensors.

Figure 5:
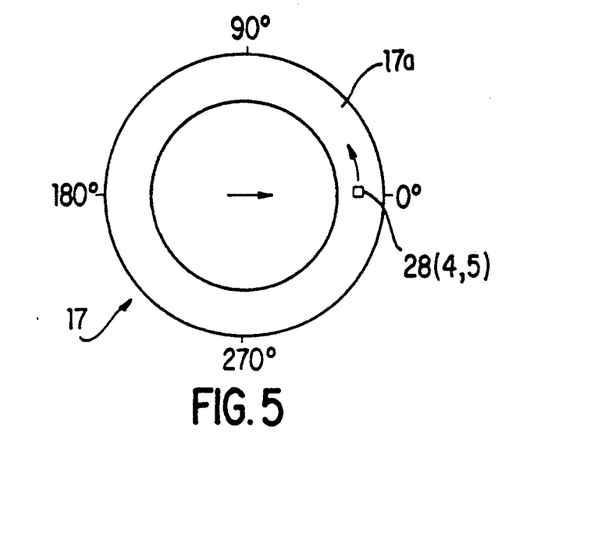
FIG. 5 is an explanatory drawing showing the method of measuring using the apparatus according to the present invention.

Using the electrical signal, namely, the data on the time t taken for the light emitted from the light-emitting means 4 to reach the photo-detecting means 5, supplied from the photo-detecting means 5, the calculating means 6 calculates distances d to various points on the surface of the tire 17 and a toe-in length or angle and camber angle from the data on the calculated distances d. More particularly, the calculating means 6 is adapted to calculate the distance d from each of the points on the outer surface 17a of the tire 17 to the photo-detecting means 5 (or the light-emitting means 4) as shown in FIG. 5 by using the following formula:

$d = ct/2$ (where $c$: light velocity)

Figure 6:
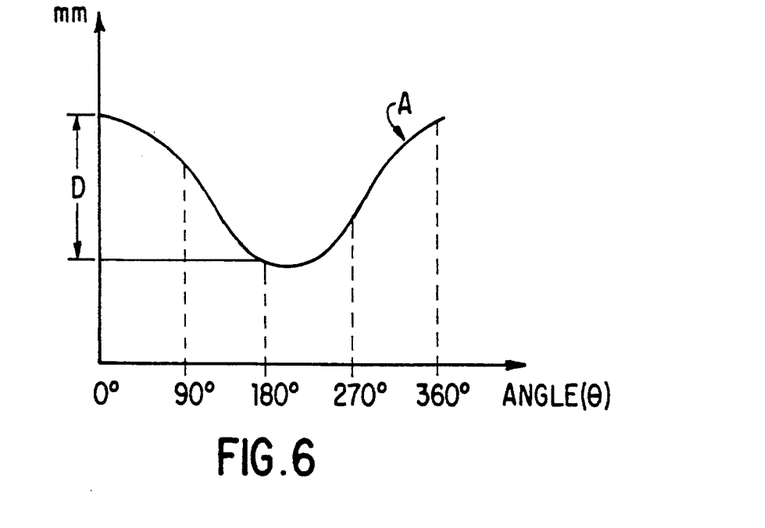
FIG. 6 is a graph showing the method for processing data measured with the apparatus of the present invention.

The calculation is done of the distances d from the points in, for example, a counterclockwise sequence from the initial point of 0°. The distances from various points, calculated by the calculating means 6, are sequentially plotted like the graph A on the screen 7a of the displaying means 7 as shown in FIG. 6. The calculating means 6 calculates a toe-in length (D) from a difference D between the distance $D_0$ at the angle of 0° and the distance $d_2$ at the angle of 180°, among the data in the graph A, and also calculates a camber angle ($\alpha$) by using the following formula using a distance $d_1$ at the angle of 90°, distance $d_3$ at the angle of 270° and a radius of rotation r of the photo-detecting means 5:

$\alpha = \tan^{-1}[2r/(d_3 - d_1)]$

For the camber angle ($\alpha$), calculation uses as data an intermediate value between the distances at the angles of 180° and 360° taking in consideration the swelling of the tire portion having an angle of 270° and treading on the ground surface.

The displaying means 7 is provided for a positive and rapid adjustment of the toe-in length or angle that should be done as necessary at the same time as the measurement of toe-in length or angle. It sequentially displays on the screen 17a thereof the data on the distances from various points on the tire 17 that are delivered from the calculating means 6.

Figure 7:
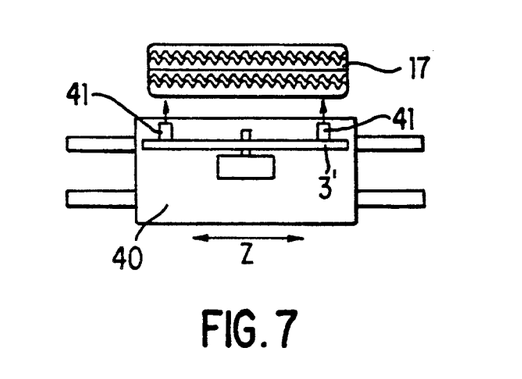
FIG. 7 is a plan view showing an variant of the positioning means in the present invention.
Figure 8:
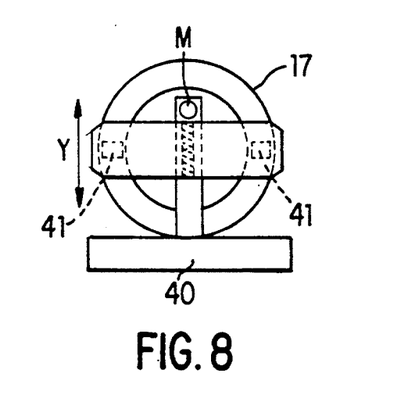
FIG. 8 is a front view showing the positioning means shown in FIG. 7.

It should be noted that the positioning means in this embodiment uses the follower 32 coupled to the tire supports 31 and which is moved following the supports 31, to which however the present invention is not limited. This movement may be attained as follows. For example, the tire supports are not coupled to the follower, a truck 40 may be inched horizontally (in the Z-direction) near the tire 17 as shown in FIG. 7 and vertically (in the Y-direction) as shown in FIG. 8 to measure the shape of tire side-lace and calculate the center of the tire. Thus the rotary disk 3' is moved so at to be centered with the tire.

Figure 9:
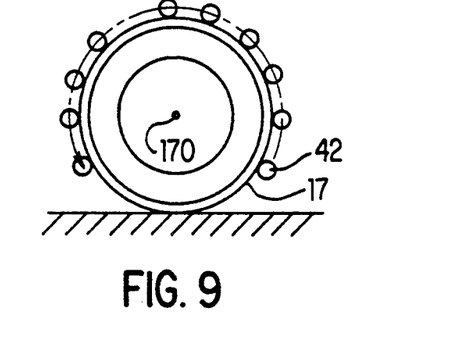
FIG. 9 is an explanatory drawing showing the method for calculating the center of rotation of the tire in the positioning means in the present invention.
Figure 10:
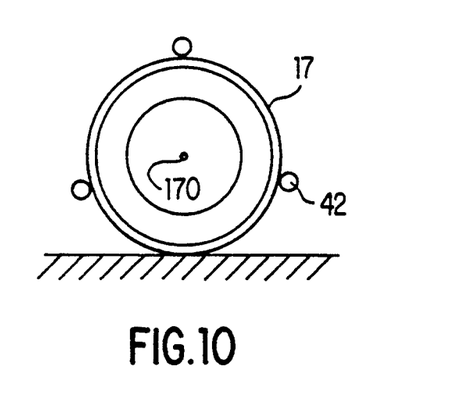
FIG. 10 is an explanatory drawing showing the method for calculating the center of rotation of the tire in the positioning means in the present invention.

Also in the positioning means of the present invention, the center of the tire may be calculated by putting a touch-sensor 42 into contact with the outer circumferential surface of the tire at a constant torque, moving the touch-sensor 42 along the outer circumference of the tire 17 with the torque kept constant as it is, and determine the center 170 of the tire based on the moving locus of the touch-sensor 42. Also, the center of the tire may be otherwise determined. That is, a size (diameter) of the tire 17 is previously supplied, three positions on the outer circumferential surface of the tire 17 are measured by the touch-sensor 42, and the center of the tire 17 is calculated from the measured positions.

As discussed in the foregoing, the wheel alignment measuring apparatus can be used to measure the distances to various points on the tire surface by means of the light of a predetermined wavelength emitted from the light-emitting means and to determine the toe-in angle or length and camber angle of the tire based on the measured distances. In other words, the toe-in length or angle and camber angle can be measured without any contact with the tire under inspection, so it is possible to effectively prevent any trouble which would occur when such measurement is done in contact with the tire, such as damage of the measuring apparatus, error caused by the oscillation or the like of the tire.

Also, with the wheel alignment measuring apparatus according to the present invention, it is possible to effectively correct any error of measurement caused by any partial irregularities on the tire, namely, to attain a higher accuracy of measurement since the calculating means incorporated sequentially calculates the distances to various points on the tire surface from the time taken from the light emitted from the light-emitting means at many short time intervals to return, as reflected, to the light-emitting means (photo-detecting means).

Furthermore, the present invention provides a wheel alignment measuring apparatus in which the positioning means makes the center of rotation of the tire accurately coincide with that of the rotary disk.

What is claimed is:

1. A wheel alignment measuring apparatus for measuring the toe-in length or angle and camber angle of a fixedly positioned vehicular tire under inspection, comprising:
    an X-direction member which is movable in the direction of an axle coupling right and left wheels of a vehicle;
    a Y-direction member which is movable vertically with respect to said X-direction member;
    a rotary disk mounted on a rotary shaft for rotation therewith, said shaft being pivotably supported on said Y-direction member so as to face the surface of the tire, and means for continuously rotating said rotary shaft;
    positioning means for making the center of rotation of the tire coincide with that of the rotary disk;
    at least one light-emitting means mounted on an outer surface of said rotary disk opposite to the tire so as to be movable radially of said rotary disk and symmetrical with respect to the center of said rotary disk, said light-emitting means also being rotatable as said rotary disk rotates, said light-emitting means being energized to emit light at many infinitesimal time intervals during rotation of said shaft by said means for continuously rotating said shaft;
    photo-detecting means for receiving light reflected from various points on the tire surface;
    means responsive to outputs from said photo-detecting means due to receipt of light emitted by said one light-emitting means and reflected from a tire for calculating the toe-in length or angle and camber angle of the tire based on the time taken for the light emitted from said one light-emitting means to reach said photo-detecting means; and
    means displaying the data on the toe-in length or angle calculated by said calculating means.

2. A wheel alignment measuring apparatus for measuring the toe-in length or angle and camber angle of a tire of a vehicle, wherein said tire is held against rotation, comprising:
    an X-direction member mounted to be movable in the direction of an axle coupling right and left wheels of a vehicle;
    a Y-direction member mounted to be movable vertically with respect to said X-direction member;
    a shaft rotatably supported on said Y-direction member and means for continuously rotating said shaft;

positioning means for making the center of rotation of the tire coincide with that of the rotary disk;

at least one light-emitting means mounted for rotation with said rotary disk, means for displacing said light-emitting means radially on said disk, said light-emitting means being energized to emit light at a plurality of times during rotation of said disk;

photo-detecting means for receiving light from said one light-emitting means that is reflected from points on the tire surface from which light is reflected at each of said times during rotation of said disk;

means responsive to outputs from said photo-detecting means due to said received light for calculating the toe-in length or angle and camber angle of the tire based on the time taken for the light emitted from said one light-emitting means to reach said photo-detecting means; and means displaying the data on the toe-in length or angle calculated by said calculating means.

3. A wheel alignment measuring apparatus for measuring the toe-in length or angle and camber angle of a tire of a vehicle, wherein said tire has an axis of rotation and is held against rotation, comprising:

a first member mounted to be movable in the direction parallel to said axis;

a second member mounted to be movable vertically with respect to said first member;

a light-emitting device, means mounting said light-emitting device on said second member for rotation about said axis and means for continuously rotating said light-emitting device about said axis shaft, said light emitting device being energized to emit light a plurality of times toward said tire during a rotation of said light-emitting device about said axis;

means for radially displacing said light-emitting device with respect to said axis;

photo-detecting means for receiving light from said light-emitting device that is reflected from points on the tire surface from which light is reflected at each of said times during rotation of said disk, whereby said photo-detecting means receives said light a plurality of times during each full rotation of said light-emitting device about said axis;

means responsive to outputs from said photo-detecting means due to said received light for calculating the toe-in length or angle and camber angle of the tire based on the time taken for the light emitted from said light-emitting device to reach said photo-detecting means from each of said points during rotation of said light-emitting device; and means displaying the data on the toe-in length or angle calculated by said calculating means.

* * * * *